US012186869B2

(12) United States Patent
Jablonski et al.

(10) Patent No.: US 12,186,869 B2
(45) Date of Patent: Jan. 7, 2025

(54) POWERED FASTENER DRIVING TOOL

(71) Applicant: Illinois Tool Works Inc., Glenview, IL (US)

(72) Inventors: David W. Jablonski, Wheaton, IL (US); Joey Lee, New Taipei (TW)

(73) Assignee: Illinois Tool Works Inc., Glenview, IL (US)

( * ) Notice: Subject to any disclaimer, the term of this patent is extended or adjusted under 35 U.S.C. 154(b) by 772 days.

(21) Appl. No.: 17/400,920

(22) Filed: Aug. 12, 2021

(65) Prior Publication Data

US 2021/0370488 A1 Dec. 2, 2021

Related U.S. Application Data

(63) Continuation of application No. 16/410,519, filed on May 13, 2019, now Pat. No. 11,117,249.

(60) Provisional application No. 62/675,447, filed on May 23, 2018.

(51) Int. Cl.
*B25C 1/08* (2006.01)

(52) U.S. Cl.
CPC .................................... *B25C 1/08* (2013.01)

(58) Field of Classification Search
None
See application file for complete search history.

(56) References Cited

U.S. PATENT DOCUMENTS

| | | | | | |
|---|---|---|---|---|---|
| 3,497,125 | A | * | 2/1970 | O'Brien | B25C 1/14 227/10 |
| 3,549,074 | A | * | 12/1970 | Brunelle | B25C 1/143 227/10 |
| 3,688,964 | A | | 9/1972 | De Caro | |
| 3,910,477 | A | | 10/1975 | Kavan | |
| 4,487,353 | A | | 12/1984 | Benson et al. | |
| 4,493,376 | A | * | 1/1985 | Kopf | B25C 1/143 173/210 |
| 4,533,077 | A | | 8/1985 | Jochum | |
| 4,804,127 | A | | 2/1989 | Kirkman | |
| 5,170,922 | A | | 12/1992 | Ehmig et al. | |
| 5,617,918 | A | | 4/1997 | Cooksey | |
| 5,657,919 | A | * | 8/1997 | Berry | B25C 1/143 173/DIG. 2 |
| 5,996,875 | A | | 12/1999 | Clark | |

(Continued)

OTHER PUBLICATIONS

Hilti DX 351 MX, retrieved from the Internet at https://www.hilti.com/c/CLS DIRECT FASTENING/CLS GEN PUR PATTOO CART/x709, on May 13, 2019 (available prior to May 23, 2018) (15 pages).

(Continued)

*Primary Examiner* — Tanzim Imam
(74) *Attorney, Agent, or Firm* — Neal, Gerber & Eisenberg LLP

(57) ABSTRACT

A powered fastener driving tool, and particularly a powder-actuated fastener driving tool including a housing assembly partially defining a plurality of pawl leg pockets, a piston assembly and a barrel assembly removably and partially positionable in a receiver assembly that is partially positioned in the housing assembly, and a plurality of attachment pawls including respective legs positioned in respective ones of the pawl leg pockets and configured to maintain the piston assembly and the barrel assembly removably and partially positionable in the receiver assembly.

17 Claims, 6 Drawing Sheets

(56) References Cited

U.S. PATENT DOCUMENTS

| | | | | |
|---|---|---|---|---|
| 6,015,078 | A * | 1/2000 | Almeras | B25C 1/143 227/8 |
| 6,039,229 | A * | 3/2000 | Pfister | B25C 1/14 227/10 |
| 6,059,162 | A | 5/2000 | Popovich et al. | |
| 6,298,923 | B1 | 10/2001 | Schmid | |
| 6,378,752 | B1 * | 4/2002 | Gaudron | B25C 1/186 227/10 |
| 7,028,876 | B2 | 4/2006 | Hirtl et al. | |
| 7,048,166 | B2 | 5/2006 | Pfister et al. | |
| 8,176,997 | B2 | 5/2012 | Ohlendorf | |
| 8,640,939 | B2 | 2/2014 | Ferrier | |
| 8,672,053 | B2 | 3/2014 | Hahn | |
| 2004/0094595 | A1 * | 5/2004 | Sprenger | B25C 1/14 227/10 |
| 2006/0027087 | A1 * | 2/2006 | Gaudron | B25C 1/082 42/108 |
| 2007/0012466 | A1 | 1/2007 | Sell | |
| 2010/0147542 | A1 | 6/2010 | Schmid | |
| 2010/0258609 | A1 | 10/2010 | Lee | |
| 2011/0006097 | A1 * | 1/2011 | Ferrier | B25C 1/14 227/10 |
| 2011/0290517 | A1 | 12/2011 | Takeuchi | |
| 2012/0325509 | A1 | 12/2012 | Puzio | |
| 2013/0161044 | A1 | 6/2013 | Hecht | |
| 2013/0206809 | A1 | 8/2013 | Popovich | |
| 2013/0333908 | A1 | 12/2013 | Lennartz | |
| 2014/0252060 | A1 * | 9/2014 | Segura | B25C 1/008 227/8 |
| 2017/0072549 | A1 | 3/2017 | Blessing | |
| 2019/0358799 | A1 | 11/2019 | Jablonski | |

OTHER PUBLICATIONS

International Search Report and Written Opinion from International Application No. PCT/US2019/032428, dated Aug. 14, 2019 (14 pages).

SA270 Tool Operator's Safety & Operating Instruction Manual, by Ramset®, available prior to May 23, 2018 (16 pages).

* cited by examiner

POWERED FASTENER DRIVING TOOL

PRIORITY

This application is a continuation of and claims priority to and the benefit of U.S. patent application Ser. No. 16/410,519, filed May 13, 2019, which claims priority to and the benefit of U.S. Provisional Patent Application No. 62/675,447, filed May 23, 2018, the entire contents of each of which are incorporated herein by reference.

BACKGROUND

Powered fastener driving tools are well known and commercially widely used throughout North America and other parts of the world. Powered fastener driving tools are typically electrically powered, pneumatically powered, combustion powered, or powder-actuated. Powered fastener driving tools are typically used to drive fasteners (such as nails, staples, and the like) to connect a first material, item, or workpiece to a second material, item, workpiece, or substrate.

Various known powered fastener driving tools include: (a) a housing; (b) a power source assembly in, connected to, or supported by the housing; (c) a fastener supply assembly in, connected to, or supported by the housing; (d) a fastener driving assembly in, connected to, or supported by the housing; (e) a trigger mechanism partially in, connected to, or supported by the housing; (f) a power setting assembly in, connected to, or supported by the housing; and (g) a fastener guide connected to or supported by the housing. The fastener guide is configured to contact a workpiece and to operatively work with the trigger mechanism such that the fastener guide needs to be depressed or moved inwardly a predetermined distance with respect to the housing before activation of the trigger mechanism causes actuation of the power fastener driving tool.

As mentioned above, various known powered fastener driving tools are powder-actuated. Powder-actuated fastener driving tools are typically used in construction and manufacturing to attach one or more items or materials to hard substrates (such as steel or concrete) using fasteners. Powder-actuated fastener driving tools typically eliminate the need to drill holes with a concrete drill bit or to use anchors and screws for such fastening applications. For example, powder-actuated fastener driving tools are commonly used by electricians to attach conduit clips, electrical junction boxes, and various other items to concrete, masonry, and steel substrates.

Powder-actuated fastener driving tools use a controlled explosion created by a small chemical propellant charge to propel the fastener through the first object (such as the junction box) and into second object (such as the concrete wall). Powder-actuated fastener driving tools are typically either high velocity or low velocity. High velocity powder-actuated fastener driving tools typically cause the propellant charge to act directly on or directly drive the fastener. Low velocity powder-actuated fastener driving tools typically cause the propellant charge to act on a piston that in turn acts on or drives the fastener. Fasteners used by powder-actuated fastener driving tools are typically nails made of high quality, hardened steel, although they may be made from other materials.

Like other powered fastener driving tools mentioned above, known powder-actuated fastener driving tools typically have a housing that supports a trigger that must be actuated to cause the firing pin of the powder-actuated fastener driving tool to reach the load to fire it. Certain known powder-actuated fastener driving tools also have a fastener guide in the form of a muzzle safety interlock. If the muzzle is not pressed against a surface with sufficient force, the tool blocks the firing pin from reaching the load to fire it. This prevents the powder-actuated fastener driving tool from discharging in an unsafe manner and causing the fastener to become an undesired projectile.

In various known powder-actuated fastener driving tools, residue from the powder actuated load going off collects in various places within the housing of the powder-actuated tool. For example, in many known powder-actuated fastener driving tools where the powder loads are collated in a load strip and fed through the tool, the load strip advances through the tool, and particularly through a load strip receiver in the tool. As each of the powder-actuated loads on the load strip is activated, small amounts of residue are discharged. This residue often builds up in the various portions of the powder-actuated fastener driving tool. Such residue build-up can cause damage to, can cause a breakage of, or can make the powder-actuated fastener driving tool less functional, partially inoperable, or completely inoperable.

Thus, powder-actuated fastener driving tools typically need to be cleaned on a regular basis to maintain optimal performance. To clean such tools, it is typically necessary to disassemble certain parts of the powder-actuated fastener driving tool. After disassembly and cleaning, the disassembled parts of the powder-actuated fastener driving tool are reassembled.

While various known powder-actuated fastener driving tools have assemblies that make them relatively easy to disassemble, the assemblies of certain such known powder-actuated fastener driving tools have: (1) a relatively large quantity of parts; (2) parts that can become easily lost; and/or (3) parts that are relatively difficult and relatively time consuming to re-assemble. In certain instances, even when the user employs multiple hands in the re-assembly of the tool, overcoming the spring force during the reassembly process can be fairly difficult.

SUMMARY

Various embodiments of the present disclosure provide powered fastener driving tools and particularly powder-actuated fastener driving tools that are configured to facilitate easy and quick disassembly of certain components of the tool for cleaning of the powder-actuated fastener driving tool, and that facilitate easy and quick re-assembly of the dis-assembled components of the powder-actuated fastener driving tool after cleaning.

In various embodiments of the present disclosure, the powder-actuated fastener driving tool generally includes a housing assembly including a main housing assembly, a handle assembly extending from the main housing assembly, and a retention collar. The powder-actuated fastener driving tool includes a receiver assembly partially positionable in the main housing assembly, a barrel assembly removably and partially positionable in the receiver assembly, and a piston assembly removably and partially positionable in the barrel assembly. The powder-actuated fastener driving tool includes a fastener guide assembly removably and partially positionable in the retention collar and operably connectable to the housing assembly. The main housing assembly and the receiver assembly define a first pawl leg pocket and a second pawl leg pocket. The powder-actuated fastener driving tool further includes a first attachment pawl including a first leg positioned in the first pawl leg pocket and a second attachment pawl including a second leg positioned in the second pawl leg pocket. The legs of the attachments are pivotable in the pockets from an unlocked and fully open position to a locked and closed position.

When the attachment pawls are in the respective locked and closed positions, the attachment pawls partially extend into and through opposite sides of the receiver assembly and into opposite sides of the barrel assembly to positively engage the barrel assembly to prevent the barrel assembly from being removed from the receiver assembly and from the main housing assembly. In other words, in the locked and closed positions, the attachment pawls maintain the barrel assembly partially inserted in and attached to the receiver assembly (and to the main housing assembly). When the attachment pawls are in the respective unlocked and fully open positions, the attachment pawls do not prevent the barrel assembly from being removed from the receiver assembly and from the main housing assembly. In other words, in the unlocked and fully open positions, the attachment pawls enable the barrel assembly that is partially inserted in the receiver assembly (and the main housing assembly) to be removed from the receiver assembly (and the main housing assembly).

Other objects, features, and advantages of the present disclosure will be apparent from the following detailed disclosure, taken in conjunction with the accompanying sheets of drawings, wherein like reference numerals refer to like parts.

DETAILED DESCRIPTION

Figure 1:
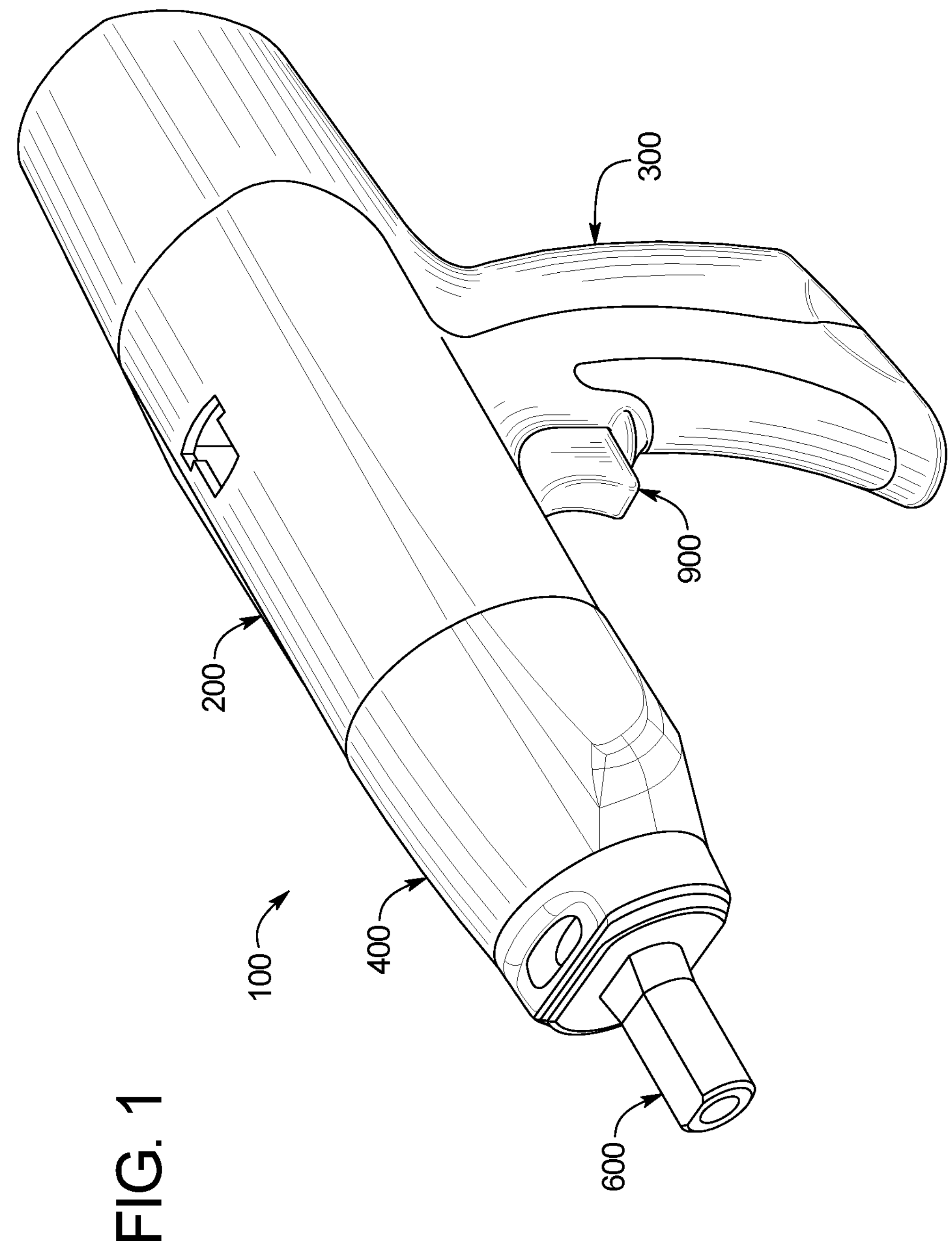
FIG. 1 is a front perspective view of a powered fastener driving tool and particularly a powder-actuated fastener driving tool of one example embodiment of the present disclosure.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the disclosure as taught herein and understood by one of ordinary skill in the art. The drawings are not to scale unless noted otherwise.

Referring now to the drawings, and particularly to FIGS. 1, 2, 3, 4, 5, and 6, the powered fastener driving tool of one example embodiment of the present disclosure is generally illustrated and indicated by numeral 100. The powered fastener driving tool in this illustrated example embodiment is a powder-actuated fastener driving tool configured to receive a conventional load strip (not shown). This example powder-actuated fastener driving tool may be referred to herein for brevity as the fastener driving tool, the driving tool, or just the tool. Such abbreviations are not meant to limit the present disclosure in any manner.

The fastener driving tool 100 of this illustrated example embodiment includes, among other components that are not shown: (a) a housing assembly including a main housing assembly 200, a handle assembly 300 extending downwardly from the main housing assembly 200, and a retention collar 400; (b) a suitable fastener driving assembly (partially shown) including a receiver assembly 500 partially positionable in or insertable in the main housing assembly 200, a barrel assembly 590 removably and partially positionable in or insertable in the receiver assembly 500, and a piston assembly 580 removably and partially positionable in or insertable in the barrel assembly 590; (c) a fastener guide assembly 600 removably and partially positionable in or insertable in the retention collar 400 and operably connectable to the main housing assembly 200; (d) a plurality of inwardly and outwardly pivotable attachment pawls including opposing attachment pawls 700 and 800; and (e) a trigger mechanism assembly 900 (partially shown) connected to and supported by the handle assembly 300. It should be appreciated that various other components of the powder-actuated fastener driving tool 100 are not shown and are not described below in additional detail. These other components may be well-known conventional components of a powder actuated tool, or may be suitable components needed for the operation of the tool 100, but not relevant for the description of the present disclosure.

Figure 2:
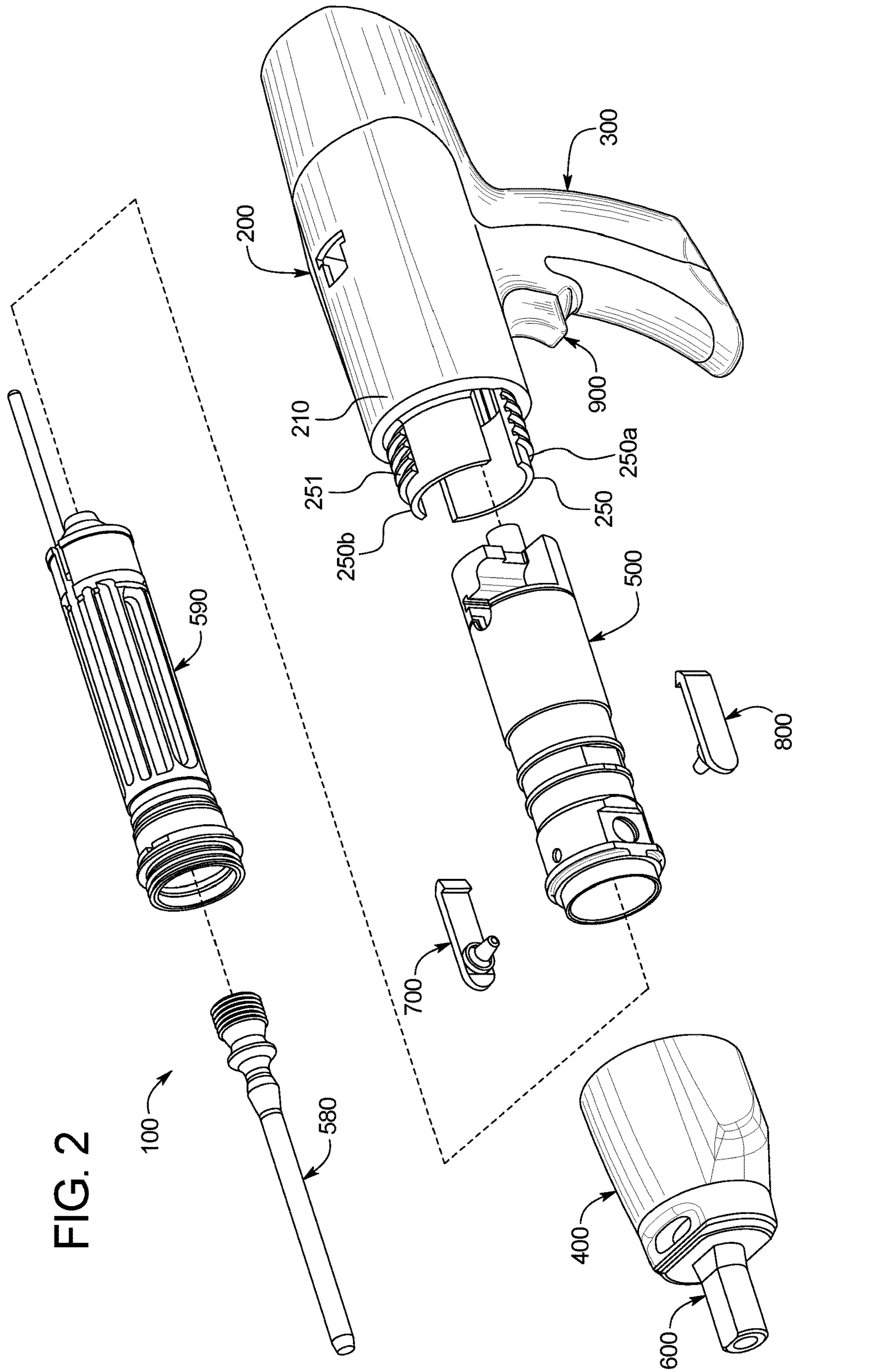
FIG. 2 is a partially exploded perspective view of the powder-actuated fastener driving tool of FIG. 1, showing certain of the components of the powder-actuated tool of FIG. 1.
Figure 3:
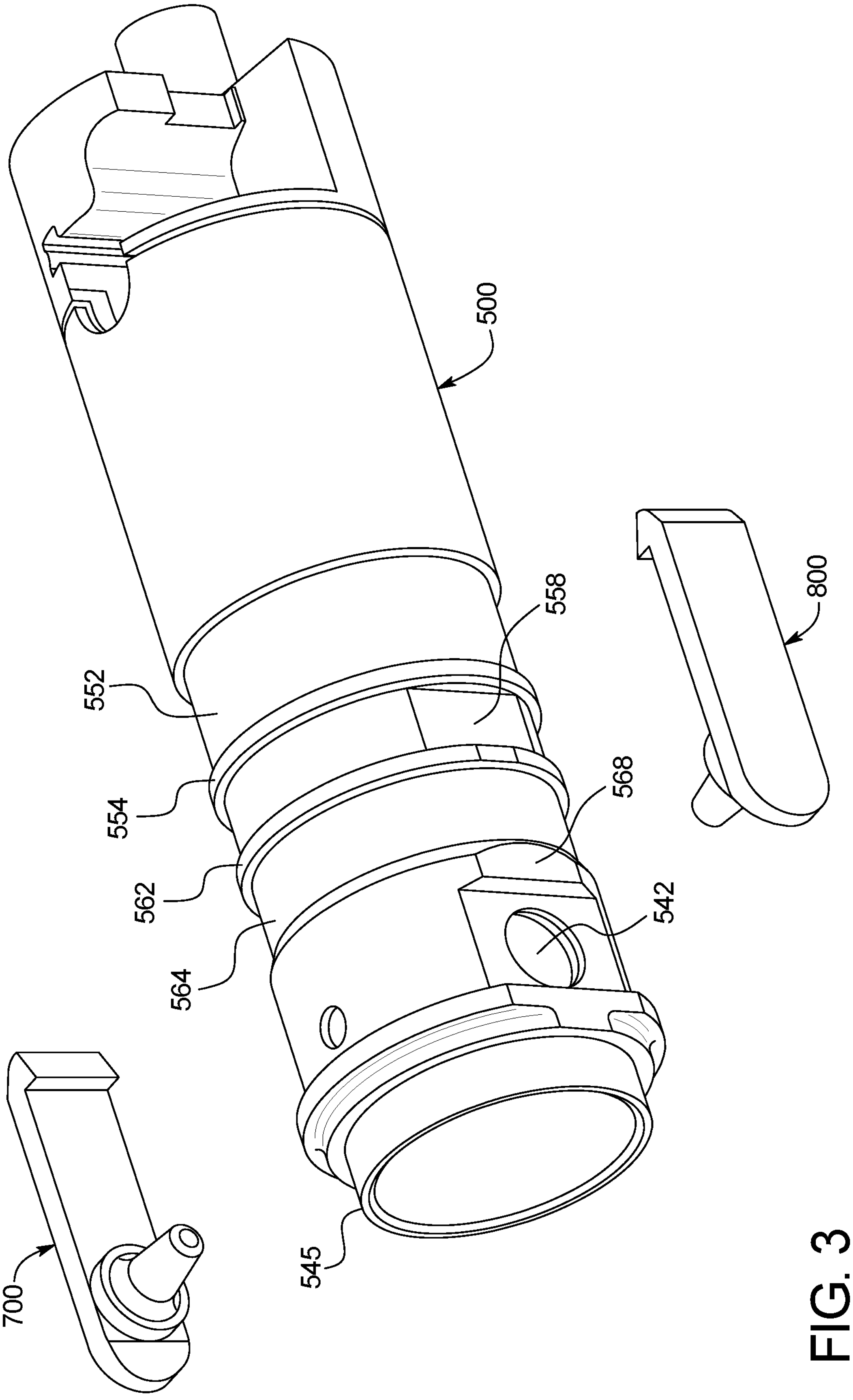
FIG. 3 is an enlarged exploded perspective view of the receiver assembly and the attachment pawls of the powder-actuated fastener driving tool of FIG. 1.
Figure 4:
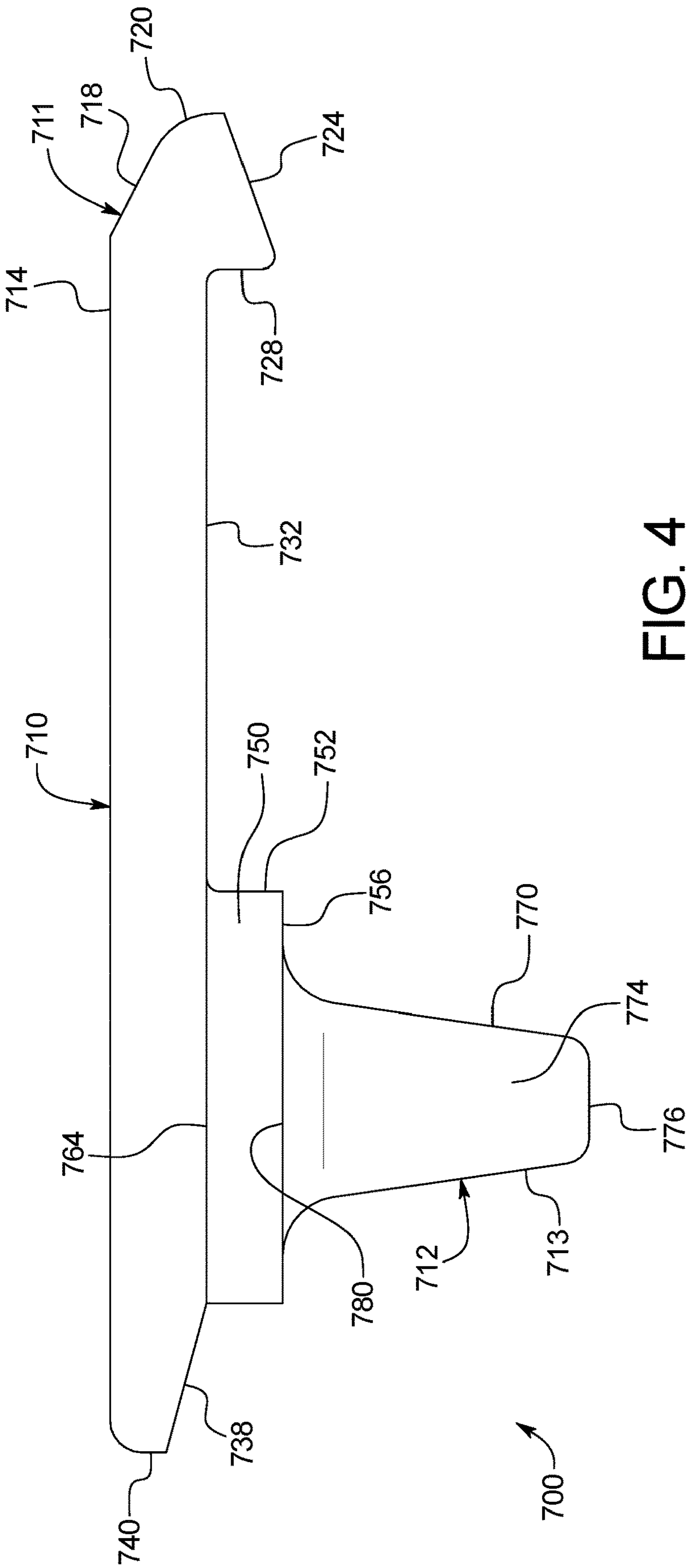
FIG. 4 is an enlarged top view of one the attachment pawls of the powder-actuated fastener driving tool of FIG. 1.
Figure 5:
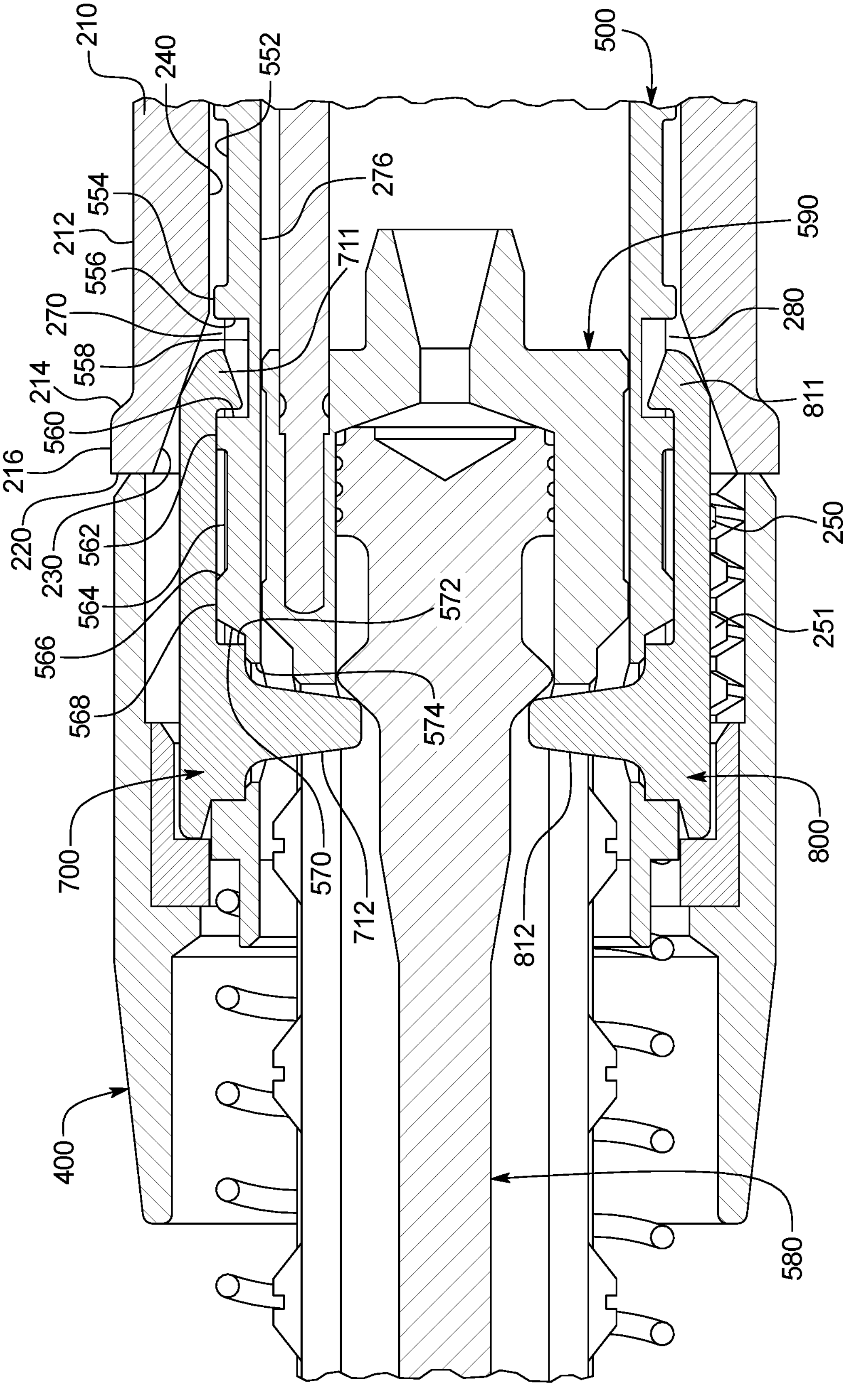
FIG. 5 is a fragmentary cross-sectional view of the powder-actuated fastener driving tool of FIG. 1, showing the attachment pawls in locked and closed positions relative to the receiver assembly and the barrel assembly such that the attachment pawls maintain the barrel assembly in the receiver assembly and attached to the main housing assembly of the powder-actuated tool.

In this illustrated example embodiment, the main housing assembly 200 includes a generally tubular outer wall 210 and an inner wall 250 extending from the outer wall 210. The inner wall 250 extends forwardly from the outer wall 210 as best seen in FIGS. 2 and 5. The inner wall 250 has a smaller inner diameter (and a smaller inner circumference) than the outer wall 210 as also best seen in FIGS. 2 and 5. As best seen in FIG. 2, this inner wall 250 includes two spaced apart sections 250*a* and 250*b* that define opposing spaced apart longitudinally extending openings that enable the inward and outward pivoting of the attachment pawls 700 and 800 as further described below. The outer wall 250 also includes outer threads 251 that facilitate attachment of the inner threaded retention collar 400 to the main housing assembly 200.

Figure 6:
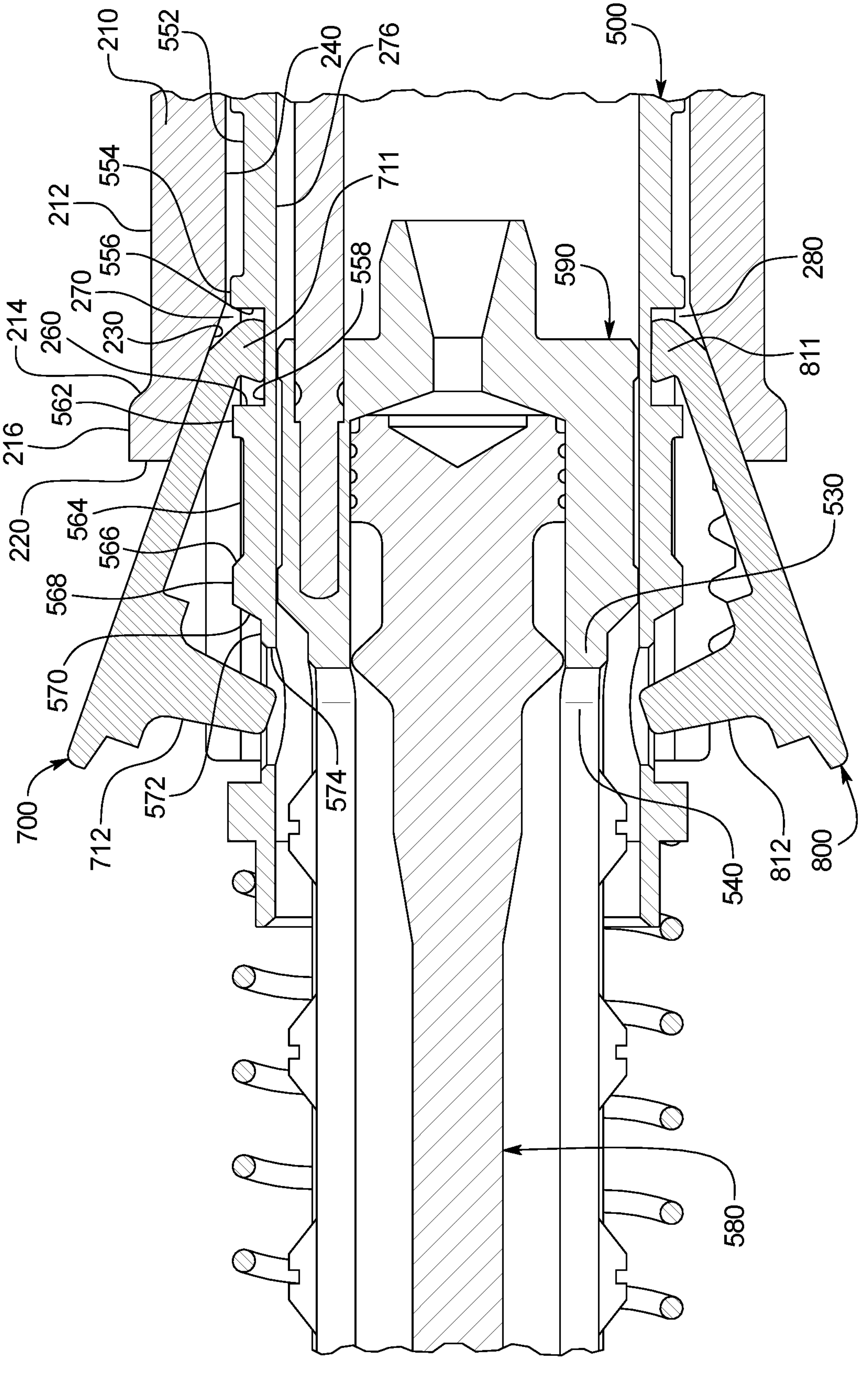
FIG. 6 is a fragmentary cross-sectional view of the powder-actuated fastener driving tool of FIG. 1, showing the attachment pawls in unlocked and open positions relative to the receiver assembly and the barrel assembly such that the barrel assembly can be detached from the receiver assembly and the main housing assembly of the powder-actuated tool.

As best seen in FIGS. 5 and 6, the generally tubular outer wall 210 includes: (1) a longitudinally extending cylindrical first outer surface 212; (2) an outwardly angled partially conical second outer surface 214; (3) a longitudinally extending cylindrical third outer surface 216; (4) a transversely extending front end surface 220; (5) an outwardly angled partially conical pawl engagement first inner surface 230; and (6) a longitudinally extending cylindrical second inner surface 240. The outer surface 214 extends from and connects the outer surface 212 and the outer surface 216. The outer surface 212 has a smaller outer diameter (and a smaller outer circumference) than the outer surface 216. The transversely extending front end surface 220 transversely extends from and connects the outer surface 216 and the pawl engagement first inner surface 230. The inner surface 240 extends from and is connected to the pawl engagement first inner surface 230.

The pawl engagement first inner surface 230 is configured to be contacted by and to engage the attachment pawls 700 and 800 when the attachment pawls 700 and 800 are in the respective unlocked and fully open positions as shown in FIG. 6. The pawl engagement first inner surface 230: (1) partially defines the respective pawl leg pockets 270 and 280 (also partially defined by the receiver assembly 500); (2) prevents the attachment pawls 700 and 800 from moving further outwardly (than shown in FIG. 6); and (3) maintains the legs 711 and 811 of the attachment pawls 700 and 800 in the respective pawl leg pockets 270 and 280. The pawl leg pockets 270 and 280 are thus defined by the outer wall 210 (and the receiver assembly 500 as further described below). The pawl leg pockets 270 and 280 are large enough to allow respective movements of the legs 711 and 811 of the attachment pawls 700 and 800 in the respective pockets 270 and 280, but small enough keep the respective legs 711 and 811 of the attachment pawls 700 and 800 in the respective pockets 270 and 280, and thus from being dislodged from the respective pockets 270 and 280 and from being disconnected from the main housing assembly 200.

As best seen in FIGS. 5 and 6, the receiver assembly 500 includes: (1) a longitudinally extending partially cylindrical first outer surface 552; (2) a longitudinally extending partially cylindrical second outer surface 554; (3) a transversely extending third outer surface 556; (4) a longitudinally extending partially cylindrical pawl engagement fourth outer surface 558; (5) a transversely extending fifth outer surface 560; (6) a longitudinally extending partially cylindrical pawl engagement sixth outer surface 562; (7) a longitudinally extending partially cylindrical seventh outer surface 564; (8) an outwardly angled partially conical eight outer surface 566; (9) a longitudinally extending partially cylindrical pawl engagement ninth outer surface 568; (10) an inwardly angled partially conical tenth outer surface 570; (11) a longitudinally extending partially cylindrical pawl engagement eleventh outer surface 572; (12) a curved transversely extending front end surface 574; and (13) a longitudinally extending partially cylindrical inner surface 576. The first outer surface 552 has a smaller outer diameter (and smaller outer circumference) than the second outer surface 554. The second outer surface 554 has a larger outer diameter (and larger outer circumference) than the fourth outer surface 558. The fourth outer surface 558 has a smaller outer diameter (and smaller outer circumference) than the sixth outer surface 562. The sixth outer surface 562 has a larger outer diameter (and larger outer circumference) than the seventh outer surface 564. The seventh outer surface has a smaller outer diameter (and smaller outer circumference) than the ninth outer surface 568. The ninth outer surface 568 has a larger outer diameter (and larger outer circumference) than the eleventh outer surface 572. The transversely extending third outer surface 556 extends from and connects the second outer surface 554 and the fourth outer surface 558. The transversely extending fifth outer surface 560 extends from and connects the fourth outer surface 558 and the sixth outer surface 562. The eight outer surface 566 extends from and connects the seventh outer surface 564 and the ninth outer surface 568. The transversely extending tenth outer surface 570 extends from and connects the ninth outer surface 568 and the eleventh outer surface 572. The curved transversely extending front end surface 574 extends from and connects the eleventh outer surface 572 and the inner surface 576.

The pawl engagement fourth outer surface 558 is configured to be contacted by and to engage the legs 711 and 811 of the attachment pawls 700 and 800 when the attachment pawls 700 and 800 are in the respective unlocked and fully open positions as shown in FIG. 6. The transversely extending third outer surface 556, the pawl engagement fourth outer surface 558, and the transversely extending fifth outer surface 560 are configured to: (1) partially define the pawl leg pockets 270 and 280; (2) prevent the attachment pawls 700 and 800 from moving further outwardly (than shown in FIG. 6); and (3) maintain the respective legs 711 and 811 of the respective attachment pawls 700 and 800 in the respective pawl leg pockets 270 and 280. The pawl engagement sixth outer surface 562, the pawl engagement ninth outer surface 568, and the pawl engagement eleventh outer surface 572 are configured to be contacted by the attachment pawls 700 and 800 when the attachment pawls 700 and 800 are in the respective locked and closed positions as shown in FIG. 5. The barrel assembly 590 is also configured to be engaged by the attachment pawls 700 and 800 and specifically by the barrel engagement hands 712 and 812 of the attachment pawls 700 and 800 when the attachment pawls 700 and 800 are in the respective locked and closed positions as shown in FIG. 5.

In this illustrated example embodiment, the attachment pawls 700 and 800 are identical and function in an identical manner. Thus, for brevity, only attachment pawl 700 will be described in additional detail. It should be appreciated that in alternative embodiments, the attachment pawls do not have to be identical. It should also be appreciated that in alternative embodiments, the quantity of attachment pawls may vary.

As best seen in FIGS. 3, 4, 5, and 6, the attachment pawl 700 generally includes: (a) an elongated body 710; (b) an engagement leg 711 at one end of the body 710; and (c) a barrel engagement hand 712 transversely extending from the other end of the body 710.

In this illustrated example embodiment, the elongated body 710 includes: (1) a longitudinally extending first housing engagement surface 714; (2) a longitudinally extending first receiver engagement inner surface 732; (3) an angled second receiver engagement surface 738; and (4) a curved transversely extending front end surface 740. The first housing engagement surface 714 and the first receiver engagement inner surface 732 face in opposite directions. The curved front end surface 740 extends from and connects the first housing engagement surface 714 and the angled receiver engagement surface 738.

In this illustrated example embodiment, the engagement leg 711 includes: (1) an angled housing engagement outer surface 718; (2) a curved transition outer surface 720; (3) an angled receiver engagement surface 724; and (4) a transversely extending inner surface 728. The outer surface 720 extends from and connects the surface 718 and the surface 724. The surface 728 extends from and connects the surface 724 to the surface 732.

In this illustrated example embodiment, the barrel engagement hand 712 includes: (1) a cylindrical transversely extending inner surface 752; (2) a receiver engagement surface 756; (3) an inwardly tapered or partially conical transversely extending receiver engagement inner surface 770; and (4) a receiver engagement inner end surface 776. The surface 752 extends from and connects the surface 732 and the surface 756. The surface 770 is connected to and extends from the surface 756. The angled or conical transversely receiver engagement inner surface 770 and the receiver engagement inner surface 776 define part of an inwardly extending barrel engagement finger 713 of the barrel engagement hand 712.

In this illustrated example embodiment, the body 710, the engagement leg 711, and the barrel engagement hand 712 are integrally attached and formed. In this illustrated example embodiment, the attachment pawl 700 (as well as attachment pawl 800) is formed from a suitable metal material. It should be appreciated that the attachment pawls can be alternatively formed in accordance with the present disclosure. It should be appreciated that the attachment pawls can be made from more than one piece in accordance with the present disclosure As mentioned above, FIG. 5 shows the attachment pawls 700 and 800 in the respective locked and closed positions, and FIG. 6 shows the attachment pawls 700 and 800 in the respective unlocked and fully open positions. It should be appreciated that in this illustrated example embodiment, the attachment pawls 700 and 800 are independently moveable. When the attachment pawls 700 and 800 are in the respective locked and closed positions as shown in FIG. 5, the barrel engagement hands 712 and 812 of the attachment pawls 700 and 800 partially extend into and positively engage opposite sides of the barrel assembly 590 (as further described below) and prevent the barrel assembly 590 from being removed from the receiver assembly 500 and the main housing assembly 200. In other words, in the locked and closed positions, the barrel engagement hands 712 and 812 of the attachment pawls 700 and 800 maintain the barrel assembly 590 partially inserted in and attached to the receiver assembly 500 and the main housing assembly 200. When the attachment pawls 700 and 800 are in the respective unlocked and fully open positions as shown in FIG. 6, the barrel engagement hands 712 and 812 of the attachment pawls 700 and 800 do not prevent the barrel assembly 590 from being removed from the receiver assembly 500 and the main housing assembly 200. In other words, in the unlocked and fully open positions, the attachment pawls 700 and 800 enable the barrel assembly 590 that is partially inserted in the receiver assembly 500 and the main housing assembly 200 to be removed from the receiver assembly 500 and from the main housing assembly 200.

More specifically, as further described below, (1) the elongated body 710 is moveable from a first position shown in FIG. 5 to a second position shown in FIG. 6 (and back to the first position); (2) the engagement leg 711 is moveable in the pawl leg pocket 270 from a first position shown in FIG. 5 to a second position shown in FIG. 6 (and back to the first position); and (3) the barrel engagement hand 712 is movable from a first position partially in the receiver assembly 500 and into engagement with the barrel assembly 590 as shown in FIG. 5 to a second position out of contact with the receiver assembly 500 and with the barrel assembly 590 as shown in FIG. 6 (and back to the first position). In the closed position, (1) surface 718 of the leg 711 of the attachment pawl 700 engages surface 230 of the outer wall 210; (2) surface 732 of the attachment pawl 700 engages surface 562 of the receiver assembly 500; (3) surface 732 of the attachment pawl 700 engages surface 568 of the receiver assembly 500; (4) surface 756 of the attachment pawl 700 engages surface 572 of the receiver assembly 500; and (5) surface 770 of the attachment pawl 700 extends into an opening 542 in or defined by the receiver assembly 500. In the closed position, the corresponding surfaces of attachment pawl 800 engage the same respective surfaces of the outer wall 210 of the main housing assembly 200, and the corresponding surfaces of the receiver assembly 500 and the barrel assembly 590. These engagements prevent the barrel assembly 590 from being detached from receiver assembly 500 and from the main housing assembly 200. It should also be appreciated that in this position, the retention collar 400 is or can be positioned around the attachments pawls 700 and 800, around the barrel assembly 590, and around the receiver assembly 500, as generally shown in FIG. 5. This is the assembled position of these components of the tool 100.

To disassemble these components of this tool 100, the retention collar 400 is unscrewed from the main housing assembly 200 and removed from being positioned around the attachments pawls 700 and 800, around the barrel assembly 590, and around the receiver assembly 500. The attachments pawls 700 and 800 are each pivoted outwardly (from the positions shown in FIG. 5 to the positions shown in FIG. 6), and the piston assembly 580 and the barrel assembly 590 are removed from the receiver assembly 500 and from the main housing assembly 200. The attachment pawls 700 and 800 remain attached to the main housing assembly 200 as shown in FIG. 6. In the unlocked and fully open position: (1) surface 714 of attachment pawl 700 engages surface 230 of outer wall 210; and (2) surface 724 of the leg 711 of attachment pawl 700 engages surface 558 of the receiver assembly 500. This configuration keeps the leg 711 of the attachment pawl 700 in the pocket 270. Likewise, in the unlocked and fully open position, the corresponding surfaces of attachment pawl 800 engage the same respective surfaces of the main housing assembly 200 and the receiver assembly 500 and keep the leg 811 of the attachment pawl 800 in the pocket 280.

After the removed components and the accessible area of the main housing assembly are all be cleaned or otherwise serviced, the fully opened attachment pawls 700 and 800 enable the piston assembly 580 and the barrel assembly 590 that have been removed from the main housing assembly 200 to be easily partially inserted back in the receiver assembly 500 and in the main housing assembly 200. Thereafter, the attachment pawls 700 and 800 can be easily pivoted back to their closed and locked positions and the retention collar 400 can be reinstalled over the piston assembly 580, the barrel assembly 590, the receiver assembly 500, and the attachment pawls 700 and 800, and also screwed back onto the main housing assembly 200. It should be appreciated that one or more of the detached components can be replaced if necessary before re-assembly.

It should be appreciated that the attachment pawls and specifically the legs of the attachment pawls are captured by the main housing assembly and facilitate such pivotal movement.

It should also be appreciated that this configuration also causes the attachment pawls to move slightly backwardly or rearwardly when opened.

It should further be appreciated that the engagements of the flat surfaces 714 and 230, and 724 and 558 assist in keeping the attachment pawl 700 in the fully open position to assist in disassembly and reassembly. Likewise, for attachment pawl 800.

This configuration facilitates ease of disassembly and re-assembly of certain components of the tool without the need to struggle to overcome spring forces while trying to hold multiple components of the tool. In other words, the pawl assembly of various embodiments does not include any springs for coupling the attachment pawls to the barrel assembly.

This configuration retains the attachment pawls 700 and 800 when they are in the fully open position attached to the housing so that they do not become lost.

This configuration uses flat surfaces on the end or leg of the pivot portion of each of the attachment pawls to keep the attachment pawls in the fully open positions trapping the attachment pawls between components as opposed to employing springs. This configuration thus eliminates the need for springs to maintain the barrel assembly 590 connected to the receiver assembly 500 and the main housing assembly 200.

It will be understood that modifications and variations may be effected without departing from the scope of the novel concepts of the present invention, and it is understood that this application is to be limited only by the scope of the claims.

The invention is claimed as follows:

1. A powder-actuated fastener driving tool comprising: (a) a main housing assembly including an inner pawl engagement surface partially defining a pawl leg pocket; (b) a receiver assembly partially positionable in the main housing assembly; (c) a barrel assembly partially positionable in the receiver assembly; (d) a piston assembly partially positionable in the barrel assembly; and (e) an attachment pawl;
- wherein the attachment pawl comprises:
  - an elongated body,
  - a leg at a first end of the elongated body, and
  - a barrel engagement hand transversely extending from a second end of the elongated body;
- wherein the barrel engagement hand is pivotably movable to a closed position where the barrel engagement hand extends into and positively engages the barrel assembly to maintain attachment of the barrel assembly to the receiver assembly and the main housing assembly;
- wherein the barrel engagement hand is pivotably moveable to an open position where the barrel engagement hand is disengaged from the barrel assembly; and
- wherein the piston assembly and the barrel assembly are both removable when the barrel engagement hand is in the open position and not removable when the barrel engagement hand is in the closed position.

2. The powder-actuated fastener driving tool of claim 1, wherein the elongated body includes a longitudinally extending first housing engagement surface, a longitudinally extending first receiver engagement inner surface, an angled second receiver engagement surface, and a curved transversely extending front end surface.

3. The powder-actuated fastener driving tool of claim 2, wherein the first housing engagement surface and the first receiver engagement inner surface face in opposite directions.

4. The powder-actuated fastener driving tool of claim 3, wherein the curved transversely extending front end surface extends from and connects the first housing engagement surface and the angled second receiver engagement surface.

5. The powder-actuated fastener driving tool of claim 1, wherein the leg includes a housing engagement outer surface and an angled receiver engagement surface.

6. The powder-actuated fastener driving tool of claim 1, wherein the leg includes an angled housing engagement outer surface, a curved transition outer surface, an angled receiver engagement surface, and a transversely extending inner surface.

7. The powder-actuated fastener driving tool of claim 1, wherein the barrel engagement hand includes a cylindrical transversely extending inner surface, a receiver engagement surface, an inwardly tapered transversely extending receiver engagement inner surface, and a receiver engagement inner end surface.

8. The powder-actuated fastener driving tool of claim 7, wherein the inwardly tapered transversely extending receiver engagement inner surface and the receiver engagement inner end surface define part of an inwardly extending barrel engagement finger of the barrel engagement hand.

9. The powder-actuated fastener driving tool of claim 7, wherein the elongated body, the leg, and the barrel engagement hand are integrally attached and formed from a metal material.

10. A powder-actuated fastener driving tool attachment pawl for a powder-actuated fastener driving tool having: (a) a main housing assembly including an inner pawl engagement surface partially defining a pawl leg pocket, (b) a receiver assembly partially positionable in the main housing assembly, (c) a barrel assembly removably and partially positionable in the receiver assembly, and (d) a piston assembly removably and partially positionable in the barrel assembly, the powder-actuated fastener driving tool attachment pawl comprising:
- an elongated body including a longitudinally extending first housing engagement surface, a longitudinally extending first receiver engagement inner surface, an angled second receiver engagement surface, and a curved transversely extending front end surface;
- a leg at a first end of the elongated body, the leg including an angled first housing engagement surface; and
- a barrel engagement hand transversely extending from a second end of the elongated body, the barrel engagement hand including a barrel engagement finger,
- wherein the barrel engagement hand includes a cylindrical transversely extending inner surface, a receiver engagement surface, an inwardly tapered transversely extending receiver engagement inner surface, and a receiver engagement inner end surface.

11. The powder-actuated fastener driving tool attachment pawl of claim 10, wherein the first housing engagement surface of the elongated body and the first receiver engagement inner surface of the elongated body face in opposite directions.

12. The powder-actuated fastener driving tool attachment pawl of claim 10, wherein the curved transversely extending front end surface of the elongated body extends from and connects the first housing engagement surface of the elongated body and the angled second receiver engagement surface of the elongated body.

13. The powder-actuated fastener driving tool attachment pawl of claim 10, wherein the leg includes a curved transition outer surface, an angled receiver engagement surface, and a transversely extending inner surface.

14. The powder-actuated fastener driving tool attachment pawl of claim 10, wherein the inwardly tapered transversely extending receiver engagement inner surface and the receiver engagement inner end surface define part of the barrel engagement finger.

15. The powder-actuated fastener driving tool attachment pawl of claim 10, wherein the elongated body, the leg, and the barrel engagement hand are integrally attached and formed from a metal material.

16. A powder-actuated fastener driving tool attachment pawl for a powder-actuated fastener driving tool having: (a) a main housing assembly including an inner pawl engagement surface partially defining a pawl leg pocket, (b) a receiver assembly partially positionable in the main housing assembly, (c) a barrel assembly removably and partially positionable in the receiver assembly, and (d) a piston assembly removably and partially positionable in the barrel assembly, the powder-actuated fastener driving tool attachment pawl comprising:

an elongated body including a longitudinally extending first housing engagement surface, a longitudinally extending first receiver engagement inner surface, an angled second receiver engagement surface, and a curved transversely extending front end surface, wherein the first housing engagement surface of the elongated body and the first receiver engagement inner surface of the elongated body face in opposite directions, and wherein the curved transversely extending front end surface of the elongated body extends from and connects the first housing engagement surface of the elongated body and the angled receiver engagement surface of the elongated body; and a leg at a first end of the elongated body, the leg including an angled first housing engagement surface, a curved transition outer surface, an angled receiver engagement surface, and a transversely extending inner surface; and a barrel engagement hand transversely extending from a second end of the elongated body, the barrel engagement hand including a barrel engagement finger, wherein the barrel engagement hand includes a cylindrical transversely extending inner surface, a receiver engagement surface, an inwardly tapered transversely extending receiver engagement inner surface, and a receiver engagement inner end surface, wherein the inwardly tapered transversely extending receiver engagement inner surface and the receiver engagement inner end surface define part of the barrel engagement finger.

17. The powder-actuated fastener driving tool attachment pawl of claim 16, wherein the elongated body, the leg, and the barrel engagement hand are integrally attached and formed from a metal material.

* * * * *